United States Patent [19]

Takanashi

[11] Patent Number: 4,863,227
[45] Date of Patent: Sep. 5, 1989

[54] LIGHT SCANNING DEVICE
[75] Inventor: Kenichi Takanashi, Yokohama, Japan
[73] Assignee: Ricoh Company, Ltd., Tokyo, Japan
[21] Appl. No.: 208,081
[22] Filed: Jun. 17, 1988
[30] Foreign Application Priority Data
 Jun. 19, 1987 [JP] Japan .................. 62-154625
[51] Int. Cl.$^4$ ............................... G02B 26/10
[52] U.S. Cl. ................................ 350/6.8
[58] Field of Search .......... 350/6.5, 6.6, 6.7, 6.8; 250/236

[56] References Cited
U.S. PATENT DOCUMENTS

| | | | |
|---|---|---|---|
| 4,141,620 | 2/1979 | Goshima et al. | 350/6.8 |
| 4,629,283 | 12/1986 | Plaot | 350/6.8 |
| 4,674,825 | 6/1987 | Tateoka et al. | 350/6.8 |

Primary Examiner—Bruce Y. Arnold
Assistant Examiner—Loha Ben
Attorney, Agent, or Firm—Oblon, Spivak, McClelland, Maier & Neustadt

[57] ABSTRACT

A light scanning device includes a light source unit, a first focusing optical system for focusing a light beam from the light source unit as a linear image onto a position, a rotating polygon having a reflecting surface near the position for deflecting the light beam at a constant angular velocity, a housing sealingly accommodating the rotating polygon and having a window, a second focusing optical system for focusing the light beam deflected by the rotating polygon as a spot on a surface being scanned, and a transparent plane-parallel plate fitted in the window of the housing and disposed between the reflecting surface of the rotating polygon and the first and second focusing optical systems. The plane-parallel plate is arranged to meet:

$$\theta\max < \alpha \leq \pi/2$$

$$(\pi + \theta\max - \alpha)/2 < \gamma \leq \pi/2$$

where $\alpha$ is the angle formed between the axis of the light beam applied to the rotating polygon and the optical axis of the second focusing optical system, $\theta\max$ is the effective maximum field angle of the second focusing optical system, and $\gamma$ is the angle formed between the plane-parallel plate and the optical axis of the second focusing optical system. The curvature of field of the second focusing optical system is corrected in view of the plane-parallel plate.

3 Claims, 6 Drawing Sheets

γ = 77°      γ = 90°      t = 0

F I G. 11
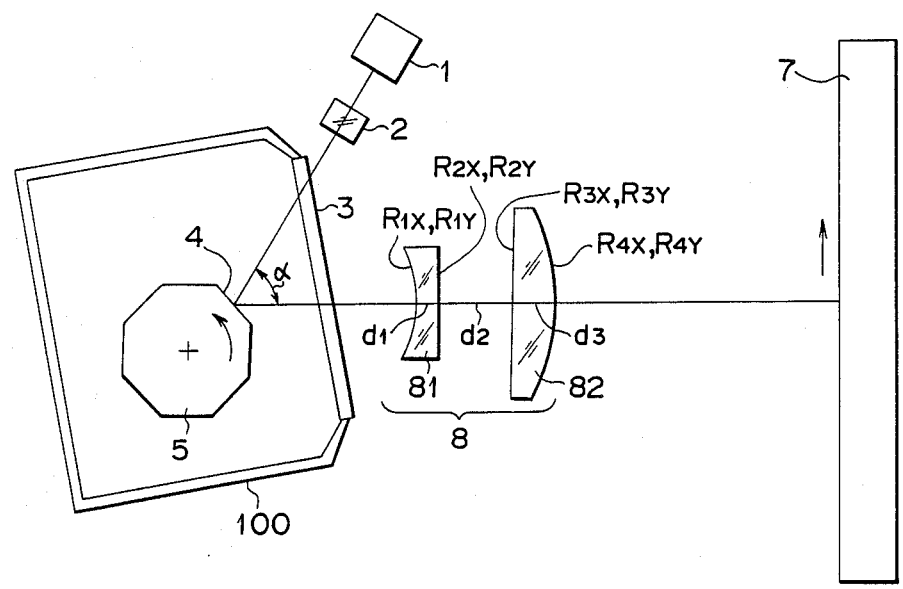

LIGHT SCANNING DEVICE

BACKGROUND OF THE INVENTION

The present invention relates to a light scanning device.

Light scanning devices are known as a device for writing and reading information by scanning a light beam. In one type of such a light scanning device, a light beam emitted from a light source is focused as a linear image, and a rotating polygon mirror has a reflecting surface positioned near the linearly focused image for deflecting the light beam at a constant angular velocity. The deflected light beam is focused as a beam spot on a surface by a focusing lens system for scanning the surface.

Such light scanning devices suffer from various problems such as noise of the rotating polygon, dirt on the rotating polygon, leakage of lubricating oil from the rotating polygon to focusing optical systems, and deposit of leaked lubricating oil on the focusing optical systems. In order to circumvent these drawbacks, there has been proposed a light scanning device including a housing which sealingly accommodates a rotating polygon and has a window in which a transparent plane-parallel plate is fitted (see Japanese Laid-Open Utility Model Publication No. 59-123821). A light beam emitted from a light source is applied to the rotating polygon through the plane-parallel plate, and the light beam deflected by the rotating polygon is then applied to a focusing lens system. However, the proposed light scanning device has not been designed to eliminate a ghost produced by a reflection from the transparent plane-parallel plate and an effect of the astigmatic difference of the plane-parallel plate on the focusing performance of the focusing lens systems.

SUMMARY OF THE INVENTION

In view of the aforesaid shortcomings of the conventional light scanning device, it it an object of the present invention to provide a light scanning device which is designed for good focusing performance and ghost prevention in view of an effect of the astigmatic difference of a transparent plane-parallel plate fitted in the window of a housing and a reflection from the plane-parallel plate.

A light scanning device according to the present invention has a light source, a first focusing optical system for focusing a light beam from the light source as a linear image in a position, rotating polygon having a reflecting surface near the position for deflecting the light beam at a constant angular velocity, a second focusing optical system for focusing the light beam deflected by the rotating polygon as a spot on a surface being scanned, and a transparent plane-parallel plate disposed between the reflecting surface of the rotating polygon and the first and second focusing optical systems.

The plane-parallel plate is disposed in a window defined in a housing which sealingly accommodates the rotating polygon therein, the plane-parallel plate extending perpendicularly to a plane in which the light beam is deflected by the rotating polygon. The light beam emitted from the first focusing optical system is applied to the rotating polygon through the plane-parallel plate, and the light beam deflected by the rotating polygon is then applied to the second focusing optical system through the plane-parallel plate.

The second focusing optical system has a focusing magnification smaller than $-1$ in an auxiliary scanning direction. The second focusing optical system couples the reflecting surface and the scanned surface in substantially conjugate relationship with respect to an auxiliary scanning direction through the plane-parallel plate.

The plane-parallel plate is arranged to meet:

$$\theta max < \alpha \leq \pi/2$$

$$(\pi + \theta max - \alpha)/2 < \gamma \leq \pi/2$$

where $\alpha$ is the angle formed between the axis of the light beam applied to the rotating polygon and the optical axis of the second focusing optical system, $\theta max$ is the effective maximum field angle of the second focusing optical system, and $\gamma$ is the angle formed between the plane-parallel plate and the optical axis of the second focusing optical system. The curvature of field of the second focusing optical system is corrected in view of the plane-parallel plate.

With the light scanning device of the invention, the problems such as noise of the rotating polygon, dirt on the rotating polygon, leakage of lubricating oil from the rotating polygon to the focusing optical systems, and deposit of leaked lubricating oil on the focusing optical systems can effectively be solved by accommodating the rotating polygon within the housing, and a ghost produced by a reflection from the transparent plane-parallel plate and an effect of the astigmatic difference of the plane-parallel plate on the focusing performance of the focusing lens systems can also effectively be prevented.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
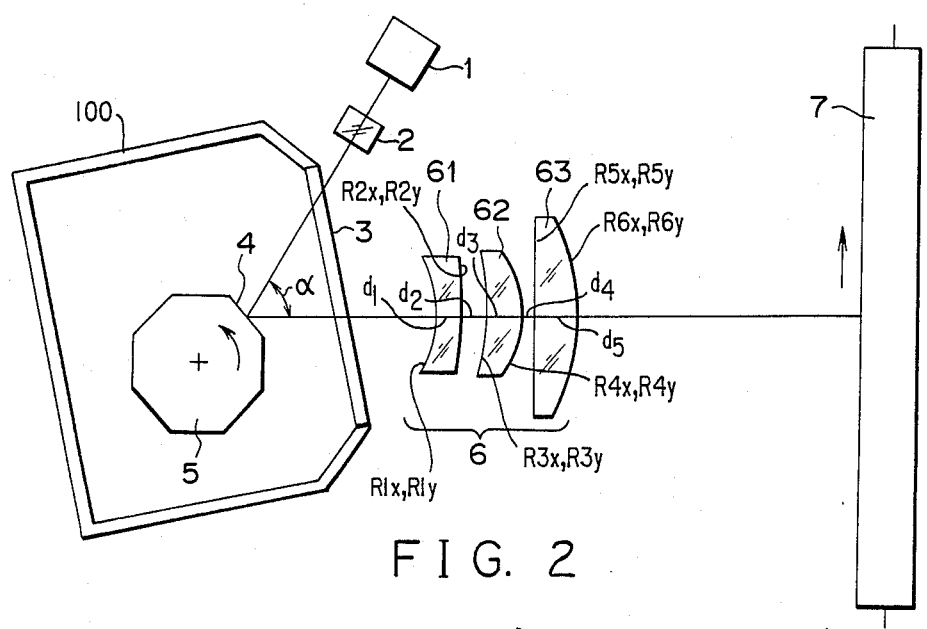
FIG. 1 is a schematic plan view of a light scanning device according to an embodiment of the present invention.

FIG. 1 shows a light scanning device according to an embodiment of the present invention.

The light scanning device shown in FIG. 1 includes a rotating polygon 5 for deflecting a light beam to cause its axis to sweep a light deflecting plane. The light scanning device of FIG. 1 is viewed in an auxiliary scanning direction, i.e., a direction normal to the light deflecting plane.

The light scanning device includes a light source unit 1 comprising either a light source for emitting a parallel-ray light beam or a light source for emitting a divergent light beam and a condensing element for converging the divergent light beam into a parallel-ray light beam. The parallel-ray light beam from the light source unit 1 is focused by a first focusing optical system 2 comprising a cylindrical lens, as a linear image near a reflecting surface 4 of the rotating polygon 5 through a transparent plane-parallel plate 3.

The plane-parallel plate 3 is fitted in a window defined in a housing (not shown) which sealingly accommodates the rotating polygon 5 therein, the plane-parallel plate 3 lying perpendicularly to the light deflecting plane. Thus, a line normal to the planar surface of the plane-parallel plate 3 lies parallel to the light deflecting plane.

The light beam reflected by the rotating polygon 5 is passed through the plane-parallel plate 3 and focused by a second focusing optical system 6 as a spot image on a surface 7, which is scanned at a constant speed by the light beam spot upon constant-speed rotation of the rotating polygon 5 in the direction of the arrow.

The second focusing optical system has a so-called f$\theta$ function. As viewed within the light deflecting plane, the focusing optical system 6 couples the infinity at the light source unit and the scanned surface 7 in conjugate relationship. As viewed within a plane normal to the light deflecting plane, the same lens system couples the reflecting position on the rotating polygon 5 and the scanned surface 7 in substantially conjugate relationship. Therefore, even if the rotating polygon 5 has a facet error, the position where the light beam is focused on the scanned surface 7 by the second focusing optical system 6 is not substantially moved in the auxiliary scanning direction. Accordingly, the problem of a facet error is corrected.

Figure 2:
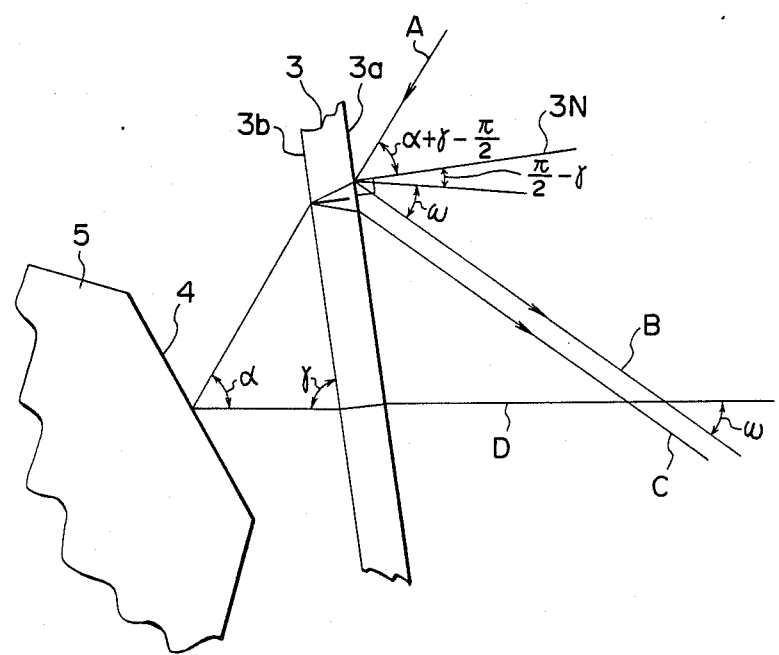
FIG. 2 is an enlarged fragmentary plan view of a portion of the light scanning device.

In FIG. 2, a line 3N is normal to a surface 3a of the plane-parallel plate 3. A light beam A applied from the cylindrical lens 2 to the plane-parallel plate 3 has a portion reflected as reflected light beams B, C by face and back surfaces 3a, 3b of the plane-parallel plate 3. The incident light beam A and the reflected light beams B, C are indicated as paraxial light rays, respectively. Since the reflected light beams B, C are parallel to each other, if the reflected light beams B, C fall on the second focusing optical system 6 within an effective deflection angle, certain image light is concentrated, resulting in a ghost. Denoted in FIG. 2 at $\gamma$ is the angle formed between the plane-parallel plate 3 and the optical axis D of the second focusing optical system 6, $\omega$ the angle formed between the optical axis D and the reflected light beams B, C, and $\alpha$ is the proper angle formed between the incident light beam A and the optical axis D in order to form the layout of the light scanning device. Stated otherwise, the angle $\alpha$ is the required angle which must be formed between the axis of the light beam applied to the rotating polygon 5 and the optical axis of the second focusing optical system 6.

As illustrated in FIG. 2, the angle of incidence of the incident light A on the plane-parallel plate 3 is represented by $\alpha+\gamma-\pi/2$, and the angle of reflection is indicated by $\omega+\pi/2-\gamma$. Since the angle of incidence is the same as the angle of reflection, we get $$\alpha+\gamma-\pi/2=\omega+\pi/2-\gamma.$$

Thus, $$\omega=\alpha+2\gamma-\pi \qquad (1)$$

Assuming that the effective maximum field angle of the focusing optical aystem 6 is expressed as $\theta$max, insofar as $\omega>\theta$max, the reflected light beams B, C are not focused in a main scanning region and no ghost would be produced even if the reflected light beams B, C are applied to the focusing optical system 6. By solving the equation (1) for $\gamma$, we get $$\gamma=(\pi+\omega-\alpha)/2.$$

Since the condition $\omega>\theta$max should be met for no-ghost generation, $\gamma$ should meet the following condition for no-ghost generation:

$$\gamma>(\pi+\theta\text{max}-\alpha)/2 \qquad (2)$$

As is apparent from FIG. 2, $\alpha>\theta$max, and generally $\alpha\leq\pi/2$. Therefore, we get $$\gamma\leq\pi/2 \qquad (3)$$

When $\alpha=\pi/2$, $\gamma\neq\pi/2$.
From the equations (2), (3) above, when $$\theta\text{max}<\alpha\leq\pi/2 \qquad (4)$$

the generation of any ghost can completely be prevented by arranging the plane-parallel plate 3 in order to meet:

$$(\pi+\theta\text{max}-\alpha)/2<\gamma\leq\pi/2 \qquad (5)$$

Since the plane-parallel plate 3 has an astigmatic different by itself, the existence of this plate 3 should be taken into consideration in order to minimize variations of the aberrations of the focusing optical system 6, particularly variations of the spot diameter, and also to correct the curvature of field of the optical system 6 which is of importance in achieving a high-density spot diameter.

Two specific examples of the second focusing optical system 6, designed while taking the existence of the plane-parallel plate 3 into consideration, witll be described below. In each of the examples, fM represents the combined focal length of the second focusing optical system within the light deflecting plane, fM being selected as a fixed normalized value of 100, $\theta$max a maximum light deflecting angle, $\alpha$ an incident angle, R the radius of a circle inscribed in the rotating polygon, Fno the F number in the light deflecting plane, $\beta$ the conjugate focusing magnification between the reflecting position on the rotating polygon and the scanned surface with respect to an auxiliary scanning direction, t the thickness of the plane-parallel plate, $n_t$ the refractive index of the plane-parallel plate, Rix the radius of curvature in the light deflecting plane of the ith lengs surface as counted from the rotating polygon, Riy the radius of curvature in a plane normal to the light deflecting plane of the ith lens surface, di the ith distance between lens surfaces i.e. the distance on the optical axis between the i-th lens surface and the (i+1) th lens surface so that di represents either or both of the lens thickness ($d_1$, $d_3$, $d_5$) and the air spaces ($d_2$, $d_4$) between adjacent lenses., and ni the refractive index of the ith lens with respect to light having a wavelength of 780 nm.

In example 1 given below, the second focusing optical system comprises three lenses as shown in FIG. 1.

A first lens 61 is a spherical meniscus concave lens, a second lens 62 is a spherical meniscus convex lens, and a third lens 63 is a lens having a cylindrical surface and a toric surface.

EXAMPLE 1:

$fM=100$, $\beta=-4.45$, $\theta max=32.4°$, $\alpha=60°$,
$R/fM=0.132$, $Fno=54.7$, $t/fM=0.76$, $\gamma=77°$,
$n_t=1.51118$

| i | Rix | Riy | di | ni |
|---|---|---|---|---|
| 1 | −20.775 | −20.775 | 2.27 | 1.51118 |
| 2 | −192.913 | −192.913 | 2.01 | 1.51118 |
| 3 | −70.366 | −70.366 | 4.16 | 1.76605 |
| 4 | −27.986 | −27.986 | 0.83 | |
| 5 | ∞ | −53.207 | 5.3 | |
| 6 | −49.507 | −12.969 | | | wherein i represents the suffix, in Rix, Riy, Di with the i in Rix, Riy representing the i th lens surface, the "i" in di representing the distance between i-th and (i+1) th surfaces, and the "i" in ni representing the i th lens. As an example when i=3, Rix, Riy, and Di are R3x, R3y and d3.

In example 2 given below, the second focusing optical lens 8 comprises two lenses 81, 82 as shown in FIG. 11. Each of first and second lenses of the second focusing optical system is in the form of a single anamorphic lens. The first lens 81 has a first spherical surface (on which a light beam falls) and a second cylindrical surface. The first lens is a plano-concave lens in the light deflecting plane, and a double concave lens in a plane normal to the light deflecting plane. The second lens 82 has a first cylindrical surface and a second toric surface. The second lens is a plano-convex lens in the light deflecting plane and a meniscus-convex lens in a plane normal to the light deflecting plane.

EXAMPLE 2:

$fM=100$, $\beta=-3.72$, $\theta max=32.4°$, $\alpha=60°$,
$R/fM=0.17$, $Fno=36.5$, $t/fM=0.76$, $\gamma=77°$,
$n_t=1.51118$

| i | Rix | Riy | di | ni |
|---|---|---|---|---|
| 1 | −107.778 | −107.778 | 5.67 | 1.71221 |
| 2 | ∞ | 58.994 | 10.97 | 1.675 |
| 3 | ∞ | −66.18 | 6.81 | |
| 4 | −45.569 | −11.931 | | |

Figure 3:
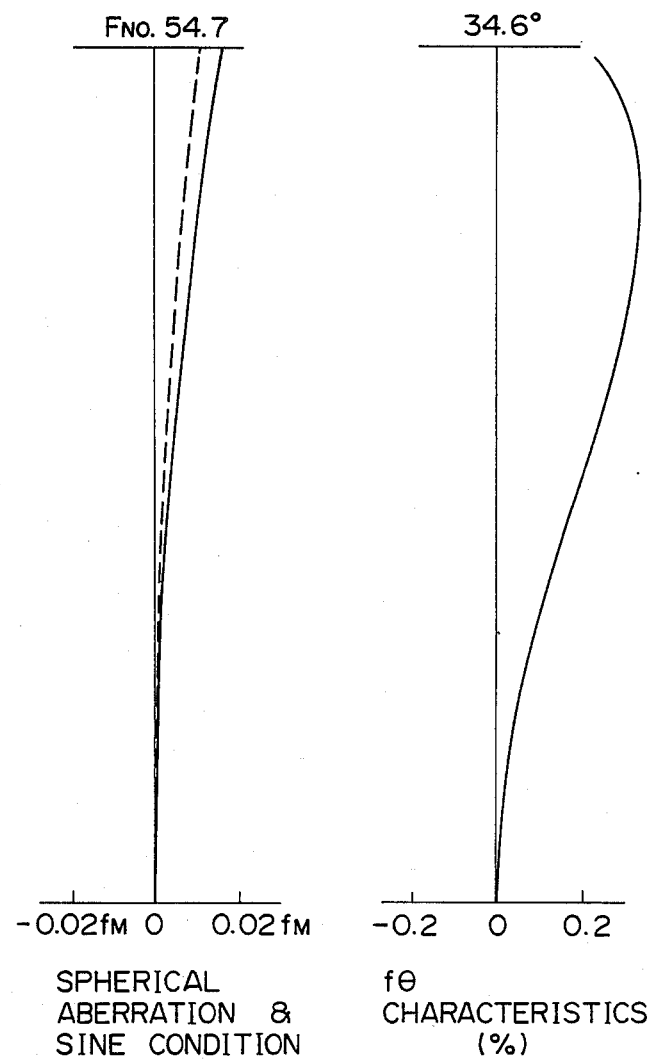
FIGS. 3 through 6 are diagrams showing aberrations and $f\theta$ characteristics of an example of the present invention.

FIG. 3 shows the spherical aberration (indicated by the solid line, the sine condition (indicated by the broken line), and the f$\theta$ characteristic of the example 1 in a main scanning direction.

The f$\theta$ characteristic is a quality which is defined by $$\{(h'-f\cdot\theta)/(f\cdot\theta)\}\times 100\%$$

where $f\cdot\theta$ is the ideal image height and $h'$ is the actual image height.

Figure 4:
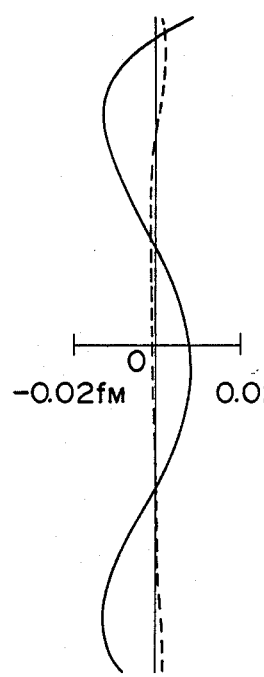
Figure 5:
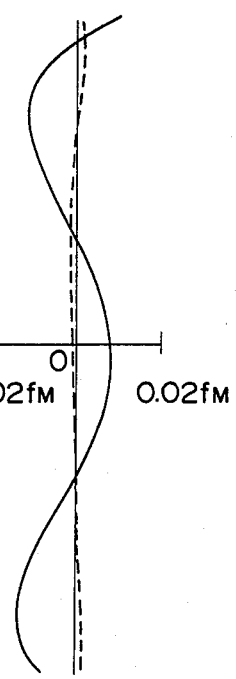
Figure 6:
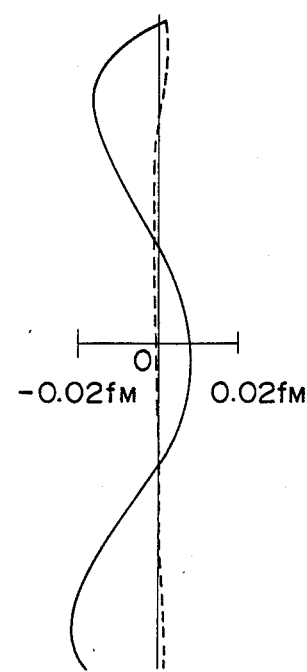

FIG. 4 illustrates the curvature of field of the focusing optical system according to the example 1 in the main scanning direction (broken-line curve) and the auxiliary scanning direction (solid-line curve) when the rotating polygon is rotated. FIG. 5 shows the curvature of field of the focusing optical system according to the example 1, with the angle $\gamma$ being 90°. Comparison with FIG. 4 indicates that the curvature of field remains substantially unchanged in the range of $77°\leq\gamma\leq90°$. This means that the accuracy of attachment of the plane-parallel plate may be relatively low as long as the curvature of field is concerned. The curvature of field of the focusing optical system of the example 1, without use of any plane-parallel plate, is as shown in FIG. 6. Comparison with FIG. 4 shows that the transparent plane-parallel plate is effective in overly correcting the curvature of field, particularly the curvature of field in the auxiliary scanning direction. Therefore, the curvature of field of the second focusing optical system must be corrected while taking the plane-parallel plate into consideration.

Figure 7:
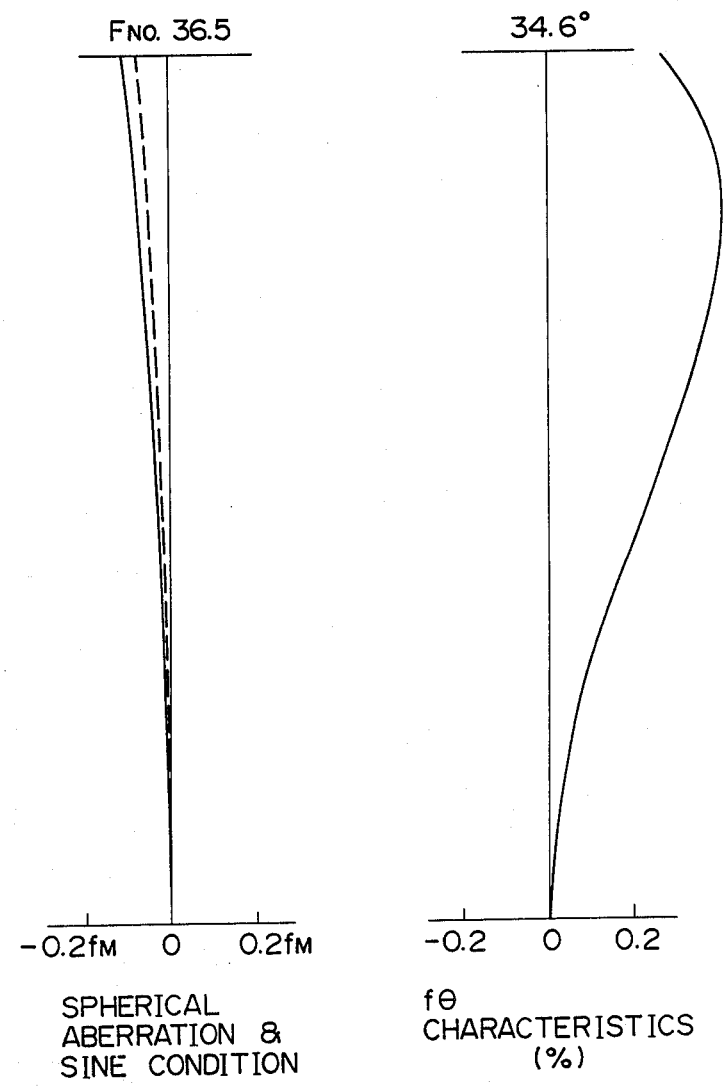
FIGS. 7 through 10 are diagrams showing aberrations and $f\theta$ characteristics of another example of the present invention.
Figure 8:
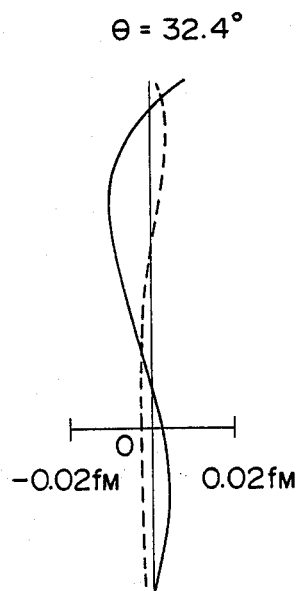
Figure 9:
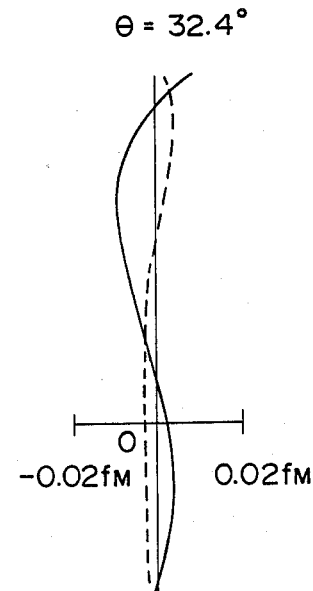
Figure 10:
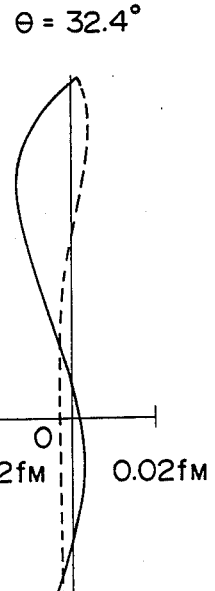

FIGS. 7 through 10 show the aberrations and f$\theta$ characteristics of the example 2. FIG. 7 illustrates the spherical aberration, sine condition, and f$\theta$ characteristics in the main scanning direction, and FIG. 8 shows the curvature of field when the rotating polygon is rotated. FIG. 9 shows the curvature of field of the focusing optical system according to the example 2 with the angle $\gamma$ being 90°, and FIG. 10 illustrates the curvature of field of the focusing optical system according to the example 2 with no plane-parallel plate used.

The curvature of field is shown in an entire light deflecting region since it is asymmetric due to variations in the reflecting position upon rotation of the rotating polygon.

Although a certain preferred embodiment has been shown and described, it should be understood that many changes and modifications may be made therein without departing from the scope of the appended claims.

What is claimed is:

1. A light scanning device comprising:
   a light source unit;
   a first focusing optical system for focusing a light beam from said light source unit as a linear image onto a position;
   a rotating polygon having a reflecting surface near said position for deflecting the light beam at a constant angular velocity;
   a housing sealingly accommodating said rotating polygon and having a window;
   a second focusing optical system for focusing the light beam deflected by said rotating polygon as a spot on a surface being scanned; and
   a transparent plane-parallel plate fitted in said window of the housing and disposed between the reflecting surface of the rotating polygon and the first and second focusing optical systems, said plane-parallel plate extending perpendicularly to a plane in which the light beam is deflected by the rotating polygon, said second focusing optical system having a focusing magnification smaller than −1 in an auxiliary scanning direction and coupling the reflecting surface and the scanned surface in substantially conjugate relationhip with respect to the auxiliary scanning direction through said plane-parallel plate, said plane-parallel plate being arranged to meet:

$$\theta max<\alpha\leq\pi/2$$

$$(\pi+\theta max-\alpha)/2<\gamma\leq\pi/2$$

where $\alpha$ is the angle formed between the axis of the light beam applied to the rotating polygon and the optical axis of the second focusing optical system, $\theta max$ is the effective maximum field angle of the second focusing optical system, and $\gamma$ is the angle formed between the plane-parallel plate and the optical axis of the second focusing optical system, the curvature of field of said second focusing optical system being corrected in view of the plane-parallel plate.

2. A light scanning device according to claim 1, wherein said second focusing optical system comprises a spherical meniscus concave lens, a spherical meniscus convex lens, and a lens having a cylindrical surface and a toric surface, which are arranged in the order named from the rotating polygon toward the scanned surface, said second focusing optical system having the following values:

fM=100, $\beta=-4.45$, $\theta$max=32.4°, $\alpha=60°$, R/fM=0.132, Fno=54.7, t/fM=0.76, $\gamma=77°$, $n_t=1.51118$

| i | Rix | Riy | di | ni |
|---|---|---|---|---|
| 1 | −20.775 | −20.775 | 2.27 | 1.51118 |
| 2 | −192.913 | −192.913 | 2.01 | 1.51118 |
| 3 | −70.366 | −70.366 | 4.16 | 1.76605 |
| 4 | −27.986 | −27.986 | 0.83 | |
| 5 | ∞ | −53.207 | 5.3 | |
| 6 | −49.507 | −12.969 | | | where fM represents the combined focal length of the second focusing optical system within the light deflecting plane, fM being selected as fixed value of 100, $\theta$max a maximum light deflecting angle, $\alpha$ an angle as defined above, R the radius of a circle inscribed in the rotating polygon, Fno the F number in the light deflecting plane, $\beta$ the conjugate focusing magnification between the reflecting position on the rotating polygon and the scanned surface with respect to an auxiliary scanning direction, t the thickness of the plane-parallel plate, $n_t$ the refractive index of the plane-parallel plate, Rix the radius of curvature in the light deflecting plane of the ith lens surface as counted from the rotating polygon, Riy the radius of curvature in a plane normal to the light deflecting plane of the ith lens surface, di the ith distance between lens surfaces, and ni the refractive index of the ith lens with respect to light having a wavelength of 780 nm.

3. A light scanning device according to claim 1, wherein said second focusing optical system comprises first and second lenses arranged in the order named from the rotating polygon toward the scanned surface, said first lens comprising a single anamorphic lens having a first spherical surface and a second cylindrical surface, said second lens comprising a single anamorphic lens having a first cylindrical surface aand a second toric surface, said second focusing optical system having the following values:

fM=100, $\beta=-3.72$, $\theta$max=32.4°, $\alpha=60°$, R/fM=0.17, Fno=36.5, t/fM=0.76, $\gamma=77°$, $n_t=1.51118$

| i | Rix | Riy | di | ni |
|---|---|---|---|---|
| 1 | −107.778 | −107.778 | 5.67 | 1.71221 |
| 2 | ∞ | 58.994 | 10.97 | 1.675 |
| 3 | ∞ | −66.18 | 6.81 | |
| 4 | −45.569 | −11.931 | | | where fM represents the combined focal length of the second focusing optical system within the light deflecting plane, fM being selected as fixed value of 100, fS the combined focal length of the second focusing optical system in a plane normal to the light deflecting plane, $\theta$ a light deflecting angle, $\alpha$ an angle as defined above, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distance between lens surfaces, and ni the refractive index of the ith lens with respect to light having a wavelength of 780 nm.

* * * * *